United States Patent [19]

Zimlich, III

[11] Patent Number: 5,316,782

[45] Date of Patent: May 31, 1994

[54] PRODUCT AND PROCESS OF MAKING A PRODUCT FLAVORED USING A BY-PRODUCT OF ALCOHOL PRODUCTION

[75] Inventor: Joseph A. Zimlich, III, Louisville, Ky.

[73] Assignee: Brown-Forman Beverage Company, Louisville, Ky.

[21] Appl. No.: 964,088

[22] Filed: Oct. 21, 1992

[51] Int. Cl.$^5$ .......................... A23K 1/06; A23L 1/105

[52] U.S. Cl. ...................................... 426/624; 426/18; 426/31; 426/49; 426/450; 426/455; 426/456; 426/459; 426/463; 426/465; 426/493; 426/534; 426/543; 426/626; 426/654; 426/658

[58] Field of Search .................... 426/18, 31, 49, 493, 426/450, 455, 456, 459, 463, 465, 626, 654, 658, 493, 534, 543, 624

[56] References Cited

U.S. PATENT DOCUMENTS

| | | |
|---|---|---|
| 541,300 | 6/1895 | Theurer . |
| 965,521 | 7/1910 | Hoffman . |
| 1,120,328 | 12/1914 | Nilson . |
| 1,213,545 | 1/1917 | Ringler et al. . |
| 1,214,729 | 2/1917 | Wallerstein et al. . |
| 1,391,683 | 9/1921 | Herzfeld . |
| 2,067,002 | 1/1937 | Pollak .................................. 426/31 |
| 2,070,286 | 2/1937 | Lissauer et al. . |
| 2,082,711 | 6/1937 | McHargue . |
| 2,149,306 | 3/1939 | Millar . |
| 2,158,043 | 5/1939 | Grelck . |
| 2,263,608 | 11/1941 | Brown . |
| 2,396,234 | 3/1946 | Allen ...................................... 426/31 |
| 2,595,827 | 5/1952 | Boruff et al. . |
| 2,835,592 | 5/1958 | Rusoff . |
| 2,887,385 | 5/1959 | Rusoff . |
| 2,887,386 | 5/1959 | Rusoff . |
| 2,887,387 | 5/1959 | Rusoff . |
| 2,887,388 | 5/1959 | Rusoff . |
| 2,934,437 | 4/1960 | Mortion et al. . |
| 3,212,902 | 10/1965 | Bavisotto . |
| 3,620,772 | 11/1971 | Kitada . |
| 3,689,277 | 9/1972 | Sfat et al. . |
| 3,716,379 | 2/1973 | van Pottelsberghe de la Potterie . |
| 3,716,380 | 2/1973 | van Pottelsberghe de la Potterie . |
| 3,952,109 | 4/1976 | Rao et al. . |
| 4,278,699 | 7/1981 | Yoshizawa et al. . |
| 4,341,802 | 7/1982 | Hopkins . |
| 4,466,986 | 8/1984 | Guggenbuehler et al. . |
| 4,552,775 | 11/1985 | Baeling ................................. 426/624 |
| 4,828,846 | 5/1989 | Rasco et al. ........................... 426/18 |
| 4,879,130 | 11/1989 | Heyland et al. . |
| 4,957,748 | 9/1990 | Winowiski . |
| 5,061,497 | 10/1991 | Thacker et al. . |
| 5,064,665 | 11/1991 | Klopfenstein et al. . |
| 5,106,634 | 4/1992 | Thacker et al. . |

Primary Examiner—Helen F. Pratt
Attorney, Agent, or Firm—Willian Brinks Hofer Gilson & Lione

[57] ABSTRACT

A process for manufacturing flavors from the spent mash of a fermentation mixture is provided wherein the spent mash of the fermentation mixture after distillation is separated into two constituent portions, the thin stillage and the wet distillers' grains. The thin stillage portion is then combined with a base to adjust pH thereof to between about 7 and about 11. The pH-adjusted thin stillage portion is then cooked at a temperature between about 130° F. and about 210° F. for a period of about 4 to about 14 hours. The cooked solution is concentrated in an evaporator until about 30% wt. solids level is obtained. The product is then dried to about 5–about 10% wt. moisture content. The product obtained has different flavors, depending on the base added and the pH of the cooking step. If the base is sodium hydroxide, the product has a bland, sweet or yeasty flavor if the pH is 8.5, maple or caramel flavor if the pH is 9.5, and a cracker or nutty flavor if the pH is 10.5. The product also comprises about 10 to about 28% wt. of total dietary fiber. Instead of the thin stillage, a yeast-containing by-product of beer production, brewers' cream yeast or brewers spent yeast, can be used as the starting material for the process.

59 Claims, No Drawings

PRODUCT AND PROCESS OF MAKING A PRODUCT FLAVORED USING A BY-PRODUCT OF ALCOHOL PRODUCTION

BACKGROUND OF THE INVENTION

1. Field of Invention

The present invention is directed to a process for treating a thin stillage portion of a by-product of a process for producing alcohol, and to products of the process. The invention is also directed to a process for treating a yeast-containing portion of a by-product of beer production. More particularly, the invention relates to the production of flavoring compositions from the thin stillage portion produced during alcoholic beverage distillation, and from the yeast-containing portion of a by-product of beer production.

2. Related Art

It is known that the fermentation of various carbohydrate materials, such as cereal grains, and subsequent distillative separation of volatile products, such as ethanol, provides distillation residues. These residues have been the subject of attempts by researchers to manufacture a food or food supplement which takes advantage of their nutritional attributes. In particular, the spent mash, which includes distillers' grains and solubles, is believed to have considerable nutritional value due to its high protein and fiber content and has been shown to be useful as a supplement for ruminant animal feed. For example, Baeling et al., U.S. Pat. No. 4,552,775, discloses a method of thermally dewatering the liquid stillage residue from the fermentation and distillation of grain raw material to produce an animal feed.

It is also known to produce a human quality food from some by-products of fermentation and distillation of grain raw materials. For example, Rasco et al., U.S. Pat. No. 4,828,846, discloses a food product suitable for human consumption produced from cereal grain residues remaining after alcohol fermentation. The food product is suitable for use as a supplement to baking flours and the like. This product is obtained by controlling between 4.0–5.0 the pH of various enzymatic conversions of starch. The pH is controlled using citric, malic, acetic, lactic, tartaric, fumaric, succinic, nitric or hydrochloric acids. The pH of the slurry residues remaining after the distillation is adjusted to between 5.0 and 8.0 using hydroxides of sodium, potassium or calcium, and the product is dried at a temperature of less than 170° F. Rasco discloses that adjusting the pH of the slurry to below 5.0 results in a product which will be rejected as "too sour," and adjusting the pH of the slurry to above about 8.0 results in a product which will be rejected as "too alkaline" (Rasco, column 4, lines 24–28).

In Thacker et al., U.S. Pat. No. 5,061,497, a method of coproduction of ethanol and a high protein, high fiber food product is disclosed which involves suspending grain in a slurry and liquefying the starch therein. The liquefied starch is separated from the grain solids fraction, and the grain solids fraction is prepared into a solids cake. None of the prospective food product undergoes the fermentation process.

These attempts, however, have not been altogether successful. Many food products made according to these processes have failed to eliminate the bitter taste of the solubles in the spent mash and acquired their unpleasant taste. See for example, Bookwalter et al., "Investigations On The Use Of Distillers' Grains or Fractions Thereof In Blended Foods For The Foods For Peace Program And Other Food Applications," U.S. Dept. of Agriculture Final Report, August 1, 1981–August 31, 1983.

It is also known to produce a flavoring for food from starch-free cereal grains. For example, Sfat, U.S. Pat. No. 3,689,277, discloses a caramel flavoring and a method of preparation of same from a starch-free protein hydrolysate by heating a granular intimate mixture of a protein hydrolysate and a sugar at between 75°–100° C. until a caramel flavor is imparted to the mixture. Rusoff, U.S. Pat. No. 2,887,388, discloses the production of a chocolate base flavor by reacting partially hydrolyzed proteins with reducing sugars and precursors thereof at a temperature which is dependent on the specific saccharide used.

The above patents and publications disclose advances made in the art of preparing food products from the by-products of distillation processes, and also in the preparation of flavorings from starch-free cereal grains. None of these patents or publications, however, discloses or suggests a method of preparing a flavoring composition only from the solubles or thin stillage portion of the spent mash produced in a distillation process, without modifying the fermentation process. Also, none of these patents or publications discloses or suggests the use of only the solubles or thin stillage portion of the spent mash, allowing the wet distillers' grains to be used for purposes for which they are well suited, e.g., in ruminant animal feed. Moreover, the prior art discussed above does not disclose or suggest a method of preparing a flavoring whose flavor can be changed by changing specific steps in the process.

SUMMARY OF THE INVENTION

It is an object of the present invention to provide a flavoring composition and a process for producing same from the thin stillage portion only of the spent mash obtained in ethanol fermentation, without modifying the fermentation process.

It is another object of the present invention to provide a flavoring composition and a process for producing same which utilizes only the thin stillage portion of the spent mash from ethanol fermentation, allowing the wet distillers' grains to be used for other purposes.

It is yet another object of the present invention to provide a process for producing a flavoring composition whose flavor can be changed by changing certain specific steps of the process.

According to one embodiment of the invention, there is provided a process of treating a thin stillage portion produced during distillation, which comprises adjusting pH of the thin stillage portion to between about 7 to about 11; maintaining the pH-adjusted thin stillage portion at a temperature of between about 130° F. to about 210° F. for about 4 to about 12 hours; concentrating the pH-adjusted thin stillage portion to obtain a viscous product; and drying the viscous product to obtain a substantially free-flowing solid product. Preferably, pH is adjusted by adding a base to the thin stillage portion.

Another embodiment of the invention is directed to a composition produced by the process of the invention (also referred to herein as the "product"). Preferably, the composition has a combined insoluble and soluble dietary fiber content of about 10% by weight (% wt.) to about 28% wt. The product has flavoring properties and can be used as a flavoring agent in various food products, including animal and human food products, particularly human food products. Because of its relatively high dietary fiber content, the product can also be used as an ingredient of food products, including animal and human food products, particularly human food products.

Yet another embodiment of the invention is directed to a composition of matter consisting essentially of a thin stillage portion which has a pH of between about 7 to about 11. Temperature of this composition is preferably maintained at between about 130° F. to about 210° F. for about 4 to about 12 hours.

Another embodiment of the invention is directed to a method of treating a thin stillage portion only produced during distillation, which comprises adjusting pH of the thin stillage portion only to between about 7 to about 11.

Yet another embodiment of the invention is directed to a process, and a product produced thereby, which comprises treating by-products of beer production known in the art as "spent brewers' yeast" or "brewers' cream yeast." This process is conducted in substantially the same manner, and produces substantially the same product, as the process described above conducted with the thin stillage.

As pointed out in greater detail below, the invention has a number of important advantages. The process of the invention produces a flavoring composition from a portion of the spent mash which has heretofore been considered to be substantially of no use in food products because of its bitter taste. Moreover, this invention does not require any modification of the fermentation or distillation processes, thus permitting the use of by-products of these processes for making whiskey or other premium alcoholic beverages for which precise conditions and high quality ingredients are necessary to obtain a desirable product.

The invention itself, along with further objects and attendant advantages, will best be understood by reference to the following detailed description thereof taken in conjunction with the claims.

DETAILED DESCRIPTION

The present invention provides for a method of producing a flavoring additive, and the flavoring additive produced thereby, from the solubles or thin stillage portion of the spent mash obtained from the distillation of cereal grain into alcoholic beverages. According to the invention, the solubles or thin stillage portion of the spent mash of the fermentation of cereal grains is converted into a flavoring additive for food.

The process for producing alcoholic beverages by fermentation of whole grain mashes is well known. Fermentation for the production of alcoholic beverages generally involves placing starch-containing grains in a mash tub, heating to gelatinize the starch, cooling, and adding malted grains and/or enzymes to convert starch to sugars. The grains used for fermentation are any conventional grains used for such purpose, e.g., milo, sorghum, corn, wheat, millet, soybeans, barley, rice or other suitable cereal grains. Fermentation is generally conducted through the addition of certain starch metabolizing microorganisms to the mash tub and incubation of the entire mixture under appropriate conditions until the original starch in the grains is converted to alcohol. Suitable microorganisms are generally yeast, however, other art-recognized equivalent organisms may also be suitable. After fermentation, the mixture is sent to a still (also known as a distillation column) to distill away the desired ethanol or alcoholic beverage product. The remaining slurry, or spent mash, is used to prepare the starting material for the present invention. It is preferred to use the spent mash by-products of the distillation process of alcoholic beverages, such as whiskey, vodka, corn whiskey, tequila, scotch, rum, grain neutral spirits and by-products from the production of nonpotable alcohol, for example, fuel alcohol. The yeast-containing by-products of the brewing of beer, known in the art as "brewers' cream yeast" and "brewers' spent yeast," are also suitable. Brewers' cream yeast is produced by separating substantially all of the yeast-containing fraction from a product of beer production while the remainder is used to produce beer. After the brewers' cream yeast is concentrated to about 95% solids, it is called brewers' spent yeast. Especially preferred are the spent mash by-products from the production of bourbon whiskey.

In the fermentation of bourbon whiskey, corn, a portion of malt barley, and water are combined in a suitable container, such as a mash tub. The container is then heated for a sufficient time to gelatinize the starch in the corn. The mixture is then cooled and the remaining malted barley and rye are added. The mixture is then further cooled and transferred into a fermenter where a suitable microorganism, for example yeast, such as *Saccharomyces cerevisiae*, and, optionally, enzymes, are added and the mixture is incubated for a suitable period of time. The fermentation mixture is then sent to a distillation column to distill off the alcohol which is then further processed to obtain the bourbon whiskey product. The mixture remaining after distillation is the spent mash.

In general, the spent mash from distillation processes producing any alcoholic beverages, such as whiskey, is comprised of a wet distillers' grains portion and a thin stillage portion. According to the invention, the spent mash is separated into the thin stillage portion and the wet distillers' grains portion. The separation may be carried out through filtration, centrifugation or any other art-recognized means of separating the wet distillers grains portion from the thin stillage portion. After separation, the wet distillers' grains can be pressed, dried and stored for use as a feed supplement for ruminant animals or other suitable uses. As used herein, the term "thin stillage portion" means that portion of the spent mash which remains after the wet distillers' grains portion is removed from the mash. For example, if a filtration apparatus is used to separate the wet distillers grain, then the thin stillage is that portion of the spent mash which passes through the filtration means (e.g., screen) while the wet distillers' grains remains on top thereof. The thin stillage portion is collected and further processed as described in further detail below. The separation of the wet distillers' grains portion from the thin stillage portion is a critical step of this invention insofar as it is only the thin stillage portion which is further processed in order to obtain the desired product, i.e., flavorings.

The wet distillers' grains portion includes mostly insoluble components from the fermentation, such as residual grain components that are substantially free of starch. Typically, the wet distillers' grains portion comprises about 50–about 55% wt. total dietary fiber, about 25–about 28% wt. protein, about 10–about 15% wt. fat, about 5–about 10% wt. moisture and about 1–about 2% wt. ash. The wet distillers' grains portion includes the insoluble portions of the hull, the pericarp, the endosperm, the germ, oil and insoluble and soluble protein and yeast, all of which comprise the major components.

The thin stillage portion includes the water soluble components from fermentation, such as proteins, organic acids, vitamins, amino acids, glycerol, high molecular weight sugars, and fatty acids and may additionally include suspended yeast cells. The thin stillage portion has a bitter taste. It is commonly believed in the art that this bitter taste is due to the presence of peptide bonds and oxidized fatty acids which exist in the thin stillage portion. The thin stillage portion generally comprises about 1% to about 15% wt., preferably about 2% to about 10% wt., and most preferably about 3% to about 6% wt. solids. The solids portion of the thin stillage comprises about 20–about 40% wt., preferably about 22–about 38% wt., more preferably about 25–about 35% wt. and most preferably about 27.5% wt. protein; about 10–about 40% wt., preferably about 12–about 38% wt., more preferably about 16–about 36% wt., and most preferably about 25% wt. of both soluble and insoluble dietary fiber; about 35–about 65% wt., preferably about 38–about 63% wt., more preferably about 40–about 60% wt., and most preferably about 45% wt. of carbohydrates; and about 4–about 16%, preferably about 6–about 14% wt., more preferably about 6% wt. to about 13% wt. and most preferably about 13% wt. of fat. The term "soluble fiber" as used herein refers to fiber which is soluble in water and comprises gums and pectin. It is believed that soluble fiber may play some role in the metabolism of energy formation. The term "insoluble fiber" refers to fiber which is insoluble in water and comprises cellulose, hemicellulose and lignin. Insoluble fiber is not digestible and it is used primarily as a bulking agent. For further discussion of soluble and insoluble fiber see Prosky, *Vitamins and Other Nutrients*, J. Assoc. Off. Anal. Chem., Vol. 67, No. 6 (1984), and Gordon, *Functional Properties vs. Physiological Action of Total Dietary Fiber*, Cereal Foods World, Vol. 34, No. 7 (1989), the entire contents of both of which are incorporated herein by reference. The thin stillage may also contain free amino acids, for example, aspartic acid, threonine, serine, glutamic acid, proline, glycine, alanine, valine, leucine, phenylalanine, glycerin, and also vitamins.

After the thin stillage portion is separated from the wet distillers' grain portion, pH of the thin stillage is raised to between about 7 to about 11. The pH is raised by adding a base to the thin stillage portion. Suitable bases for adjusting the pH of the thin stillage include hydroxides or oxides of alkali or alkaline earth metals. Preferably the base is sodium hydroxide, potassium hydroxide, calcium hydroxide, ammonium hydroxide or mixtures thereof. Most preferably, the base is sodium hydroxide or potassium hydroxide.

The pH-adjusted thin stillage portion is maintained (also referred to herein as "cooked") at the pH to which it was adjusted and at a temperature between about 130° F. to about 210° F. for from about 4 to about 14 hours. Preferably the cooking time is between about 6 to about 12 hours, and most preferably between about 8 to about 10 hours. Preferably the cooking temperature is between about 130° F. to about 190° F., and most preferably between about 150° F. to about 180° F. The temperature of the pH-adjusted thin stillage portion during this cooking step is inversely proportional to the time required for this step. For example, the cooking time can be decreased by utilizing a temperature at the high end of the temperature range. Likewise, a lower temperature will necessitate a longer cooking time. The optimal conditions for carrying out the cooking step are easily ascertained by one of ordinary skill in the art using standard techniques in combination with the present disclosure.

The pH-adjusted thin stillage portion is also concentrated until the solids content thereof is about 25% wt. to about 50% wt., preferably about 30% wt. to about 50% wt., and most preferably about 40% wt. to about 50% wt. The concentrated pH-adjusted thin stillage portion is a viscous product. For example, a 30% wt. solids content concentrated pH-adjusted thin stillage portion has a viscosity of about 500,000 centipoise (cp) to about 700,000 cp, and a 45% wt. solids content concentrated pH-adjusted thin stillage portion has a viscosity of about 900,000 cp to about $1.2 \times 10^6$ cp. The concentration step can take place either after the cooking step or simultaneously therewith. The pH-adjusted thin stillage can be concentrated by any conventional means, e.g., forced circulation evaporation, vertical tube evaporation, thin film evaporation, wiped film evaporation, membrane evaporation, or a combination of the above techniques or by any similar type of system for removing water. During the concentration step, the temperature of the mixture must be within an appropriate range to allow Maillard reactions between the reducing sugars and amino acids present in the pH-adjusted thin stillage mixture to occur. Generally, the Maillard reactions will occur between the temperatures of about 190° F. and about 220° F., preferably between about 195° F., and about 215° F. and most preferably between about 200° F. and about 210° F. at a substantially atmospheric pressure.

Preferably the pH-adjusted thin stillage is concentrated, after cooking, in a four-effect evaporator in stages as follows:

(i) first effect comprises concentrating the cooked pH-adjusted thin stillage portion at between about 200° F. and about 210° F. and a pressure of between about 1 mm Hg to about 5 mm Hg for about 0.75 to about 1.5 hours;

(ii) second effect comprises concentrating the product of the step (i) at between about 190° F. and about 195° F. and a pressure of between about 8.5 mm Hg and about 11 mm Hg for about 0.75 to about 1 hour;

(iii) third effect comprises concentrating the product of the step (ii) at between about 168° F. and about 175° F. and pressure of between about 16.0 mm Hg and about 18.5 mm Hg for about 0.5 to about 0.75 hour; and (iv) fourth effect comprises concentrating the product of the step (iii) at between about 119° F. and about 124° F. and a pressure of between about 25.5 mm Hg and about 26.5 mm Hg for about 0.15 to about 0.50 hours.

Most preferably, the pH-adjusted thin stillage is concentrated after cooking in a four-effect evaporator in stages as follows:

(i) concentrating the cooked pH-adjusted thin stillage portion at about 205° F. and a pressure of about 4 mm Hg;

(ii) concentrating the product of the step (i) at about 190° F. and a pressure of about 11 mm Hg;

(iii) concentrating the product of the step (ii) at about 170° F. and a pressure of about 18 mm Hg; and (iv) concentrating the product of the step (iii) at about 121° F. and a pressure of about 26.5 mm Hg.

The product of the evaporation process may be further dried (i.e., concentrated) to additionally decrease its moisture content to a substantially free flowing solid. This additional drying step may be conducted by any suitable means, e.g., spray drying, fluidized bed drying, single and double drum dehydrating, ring drier or other suitable means for producing a substantially free flowing solid. Most preferably, it is conducted in a double drum dehydrator. The final moisture of the dried product is generally less than about 10% wt., preferably between about 5% wt. to about 9% wt. and most preferably about 6% wt. to about 8% wt.

The aforementioned steps of separating the thin stillage portion, adjusting pH thereof, cooking, concentrating and drying the product can be conducted either in a single continuous process or batch-wise in separate and distinct steps which may be separated from each other by indefinite time intervals. Thus, each of the process steps could be conducted in a different physical location, so long as all of the steps are conducted in the order defined herein. Proper precautions should be taken during each step, and during any time intervals therebetween, to ensure that sterile conditions are maintained throughout the process because the presence of bacteria due to unsterile conditions can lead to a soured product.

The cooking step and the concentration step are interrelated with respect to time and temperature. Thus, the cooking step and the concentration step may be carried out sequentially, or alternatively, as a single, combined step. If they are carried out sequentially, the cooking step is carried out with the concentration step occurring thereafter, as a distinct step. In this way, the cooking and concentration steps may be conducted as a batchwise operation. Alternatively, the cooking step and the concentration step may be combined into one step, i.e., the two steps are carried out simultaneously. For example, by increasing the time or the temperature of the pH-adjusted thin stillage during cooking so that substantial concentration also occurs during that step, a separate concentration step thereafter may be shortened, or eliminated. In general, if the cooking step is carried out at an increased time or temperature so that substantial concentration occurs during that step, the concentration step may be carried out at a decreased temperature or for a shorter period of time or at both a decreased temperature and a shorter time period. Similarly, if the time or temperature of the cooking step is decreased, the time or temperature of the concentration step should be increased accordingly, so that substantial cooking takes place during the concentration step. The resulting cooked, concentrated product generally has a solids content of between about 25% wt. to about 50% wt., preferably between about 30% wt. to about 50% wt., and most preferably between about 40% wt. to about 50% wt.

The dried product can be used as a flavoring agent for adding to foodstuffs, particularly to food products for human consumption, such as foods and beverages. According to the invention, the product with different flavors may be obtained, depending upon the base added and the pH of the thin stillage during the cooking step. For example, if the base is potassium hydroxide, and the pH is held at about 8.5 during the cooking step, the product has a savory or beef flavor; if the pH is held at about 9.5, a chocolate, cocoa or yeasty flavor is obtained; and, if the pH is held at about 10.5, an oily or bland flavor is obtained. Similarly, if the base is sodium hydroxide, and the pH is held at about 8.5 during the cooking step, the product has a bland, sweet or yeasty flavor; if the pH is held at about 9.5, a maple or caramel flavor is obtained; and if the pH is held at about 10.5, a cracker or nutty flavor is obtained. The above flavors are obtained by cooking the pH-adjusted thin stillage portion at between about 130° to about 190° F. for about 6 to about 12 hours. Some variation in flavor may be obtained by varying the time and temperature of the cooking step. As with other natural and synthetic flavors, the perceived flavor of a food incorporating the flavoring product according to the present invention may change depending on the type of food product the flavoring agent is used in and how that final food product is prepared. For example, a specific flavor may have different sensory attributes depending on whether the final food product is simply mixed with the flavoring agent, or has been baked, fried, boiled, or subjected to other standard food preparation techniques subsequent to the addition of the flavoring agent.

The dried product includes the dewatered soluble component of the thin stillage. A complete chemical analysis of the dried product for each flavoring agent obtained is not available at this time. For the purposes of exemplification, set forth below is an approximate qualitative analysis of one product of the invention. The dried product obtained according to the present invention, wherein the pH of a thin stillage portion was adjusted to about 10.5 with potassium hydroxide and temperature of the pH-adjusted thin stillage was maintained between about 130° F. to about 190° F. for between about 6 to about 12 hours, includes the following compounds: 2,3-butanediol, 3-methylbutanol, 2,3-methylbutanol, trialkyl pyrazines, 2,3-dimethyl pyrazines, and 2,5-dimethyl pyrazines. The dried product also has a substantial amount of fiber, both dietary and non-digestible. The product comprises about 10 to about 28% wt., preferably about 13 to about 26% wt., and most preferably about 15 to about 25% wt. of the total dietary fiber (i.e., both soluble and insoluble fiber). Preferably, the product comprises between about 12 to about 19% wt. of insoluble fiber. Fiber levels will vary for each product because of the different effects of pH, the chosen base, time and temperature of cooking on the digestion of the fiber.

The invention is also directed to a composition comprising the thin stillage portion of the spent mash of a fermentation mixture which has a pH of between about 7 and to about 11. Preferably, this composition is held at a temperature of between about 130° F. to about 210° F. for between about 4 to about 14 hours. This composition is useful in preparing the dried flavoring product of the present invention in the process of the invention.

The process of the invention may also be conducted with a by-product or by-products of beer production. In general, in the production of beer and beer type products, rice and malted barley are mixed together in a mash tub. This mixture is processed until substantially all of the starch in the rice and barley are liquefied and saccharified, e.g., through heating or the addition of liquefying and saccharifying enzymes. The starch-free grains are filtered out and the resulting liquid containing the liquefied and saccharified starch, the wort, is mixed with hops or hops extract and inoculated with a suitable strain of yeast. The inoculated wort is fermented, for example at about 60° F. for about 5 to about 10 days at about 10°–14° C. The resulting liquid contains the beer, which is separated from the yeast fraction. After separation, the beer is sent for further processing. The yeast fraction also containing hops or hops extract, called "brewers' cream yeast," is commonly dried to form "brewers' spent yeast" (or "brewer' dried yeast"). The brewers' cream yeast, the brewers' dried yeast which has been resuspended in water, or a combination thereof is suitable for use as the starting material with the process of the present invention to produce the product as described herein. For example, the pH of the brewers' cream yeast or resuspended brewers' dried yeast is adjusted to a pH of between about 7 and about 11 and maintained at a temperature of between about 130° F. and about 210° F. for between about 4 to about 14 hours and concentrated to form a viscous product. This product is then dried as described herein to produce the desired flavoring product.

The invention will be further described by means of the following specific examples and comparative examples which are furnished for the purposes of illustration only and are not intended to be limitative in any manner.

EXAMPLES 1-6

Process and Product of the Invention

A whiskey product was prepared according to the following parameters. Corn, rye and malt were prepared for fermentation in the proportion of 79% corn, 11% rye and 10% malt (10% being premalt and 90% being post malt). The corn and premalt were mixed in a sterilized cooker with water at a temperature of 150° F. and stirred for 10 minutes. The temperature was raised to 250° F., held for 10 minutes, and cooled to 190° F. The rye was added, and the temperature held for 10 minutes. The mixture was then cooled to 150° F., and the post malt added and held for 10 minutes. The mixture was cooled to 75° F., and 0.63 g of Alltech Alcoholase II enzyme was added for each 100 ml of mash while stirring. The mash was pumped into sterilized 4 liter tubes that contained 160 g of yeast of the strain *Saccharomyces cerevisiae* in a malt extract media. The tubes were placed in a 30° C. water bath to ferment for three days. After fermentation, the fermented mash was removed and distilled and the distillate was sent for further processing.

The remaining spent mash was separated into the thin stillage portion and the wet distillers' grains portion through filtration in a cross filtration unit.

Six equal aliquots of the thin stillage portion were prepared. Sodium hydroxide was added to three aliquots and potassium hydroxide was added to the remaining three aliquots in such amounts that respective final pH of the NaOH-treated samples was 8.5, 9.5 and 10.5, and that of the KOH-treated samples was also 8.5, 9.5, and 10.5. Each of the pH-adjusted aliquots was cooked separately in a tank at a temperature of 140° F. for 8 hours.

The cooked pH-adjusted thin stillage portion was concentrated in an evaporator by: (i) heating and maintaining the mixture at 205° F. and a pressure of 4 mm Hg for about 1 hour; (ii) cooling and holding the product of the step (i) to 190° F. and a pressure of 11 mm Hg for about 1 hour; (iii) cooling and holding the product of the step (ii) to about 170° F. and a pressure of 18 mm Hg for about 0.75 hours; and (iv) cooling and holding the product of the step (iii) at 121° F. and a pressure of about 26.5 mm Hg for about 0.5 hours.

The resulting product had a solids content of 30%. This product was sent to a dehydrator to remove most of the remaining water. The final moisture content of the product was 7%.

The dried product was then mixed with a Gerber Rice ® baby formula (obtainable from Gerber Foods, Inc. located at Fremont, Mich.) (15% dry weight basis) and the taste was analyzed in a blind sample taste test by an evaluation panel of seven members. The panel tasted the samples blind. The mixture of rice with the dried product was intended to ascertain the flavor of the unprocessed dried product.

The panel concluded that the products had the following flavors:

| EXAMPLE | pH | ADDED BASE | FLAVORS |
|---|---|---|---|
| 1 | 8.5 | Potassium Hydroxide | Savory, Beef |
| 2 | 9.5 | Potassium Hydroxide | Chocolate, Cocoa or Yeasty |
| 3 | 10.5 | Potassium Hydroxide | Oily, Bland |
| 4 | 8.5 | Sodium Hydroxide | Bland, Sweet, Yeasty |
| 5 | 9.5 | Sodium Hydroxide | Maple, Caramel |
| 6 | 10.5 | Sodium Hydroxide | Cracker, Nutty |

EXAMPLE 7

Comparative

To compare the product of the present invention to a product of the prior art (Winowiski, U.S. Pat. No. 4,957,748), a product of Winowiski was prepared in the manner summarized below. 0.1 grams of a reducing sugar mixture of fructose, maltose and glucose were combined with 10 grams of a spent grains by-product (spent mash) of the distillation of the whiskey of Examples 1-6 (including corn, rye, and malted barley) containing 50% by wt. of solubles (i.e., thin stillage) and 50% by wt. of wet distillers' grains. The mixture was combined with 100 ml of water and the pH-adjusted to 8.5 with the addition of NaOH. The pH-adjusted mixture was then held at a temperature of 200° F. for 1 hour. The product was dried in a convection oven at 150° C. for 1 hour until a water content of 11% was obtained.

The dried product was then mixed with a 15% dry weight basis mixture of Gerber Rice ® baby formula and the taste analyzed in a blind sample taste test by an evaluation panel.

The panel concluded that the product had an unpleasant taste which was described as "dirty, metallic, oxidized and earthy."

EXAMPLE 8

Comparative

In this example, a different prior art product was prepared according to the procedure of Rasco, U.S. Pat. No. 4,828,846, as follows. 10 grams of a ground mixture of corn, rye, and malted barley was suspended in 100 liters of water. The starch in the suspension was liquefied with α-amylase to convert the starch in the mixture to dextrins. The pH of the liquefied mixture was adjusted to 4.0 with the addition of 0.2 grams of citric acid. The remaining starch was saccharified with a second enzyme, amyloglucosidase, to complete the conversion of substantially all of the starch to sugar. The suspension was inoculated with the yeast strain *Saccharomyces cerevisiae* and fermented for 3 days at 80° F. The mixture was sent to a still and the alcohol distilled off. The remaining spent grains solution was concentrated to a 40% solids content by spinning at 2,500 rpm in a centrifuge for 3 minutes. The water was then decanted off. 0.2 grams of solid sodium hydroxide, 0.2 grams of solid potassium hydroxide, and 0.8 grams of solid calcium hydroxide were added to bring the solution to a pH of 7.0. The slurry was then dried at 170° F. for 1 hour using a convection oven.

The dried product was then mixed with a 15% dry weight basis mixture of Gerber Rice ® baby formula and the taste analyzed in a blind sample taste test by an evaluation panel.

The panel concluded that the product had an unpleasant taste which was described as "dirty and earthy."

Of course, it should be understood that a wide range of changes and modifications can be made to the preferred embodiments described above. The foregoing detailed description is therefore not intended to limit the scope of the invention. The following claims, including all equivalents, are intended to define the scope of this invention.

We claim:
1. A process of treating a thin stillage portion produced during the production of alcohol comprising:
 (a) adjusting pH of the thin stillage portion to between about 7 to about 11;
 (b) maintaining the pH-adjusted thin stillage portion at a temperature of between about 130° F. to about 210° F. for about 4 to about 14 hours and concentrating the cooked, pH-adjusted thin stillage portion to obtain a viscous product; and
 (c) drying the viscous product of said step (b) to obtain a substantially free-flowing solid product.

2. The process according to claim 1 wherein the pH is adjusted in the step (a) by adding to the thin stillage portion a base selected from the group consisting of hydroxides of alkali metals, hydroxides of alkaline earth metals, oxides of alkali metals, alkaline earth metals, and mixtures thereof.

3. The process according to claim 2, wherein the base is sodium hydroxide, potassium hydroxide, calcium hydroxide, ammonium hydroxide or a mixture thereof.

4. The process according to claim 3, wherein the base is sodium hydroxide.

5. The process according to claim 4, wherein the pH is adjusted to about 8.5.

6. The process according to claim 5, wherein the solid product has a bland, sweet, or yeasty flavor.

7. The process according to claim 4, wherein the pH is adjusted to about 9.5.

8. The process according to claim 7, wherein the solid product has a maple or caramel flavor.

9. The process according to claim 4, wherein the pH is adjusted to about 10.5.

10. The process according to claim 9, wherein the solid product has a cracker or nutty flavor.

11. The process according to claim 3, wherein the base is potassium hydroxide.

12. The process according to claim 11, wherein the pH is adjusted to about 8.5.

13. The process according to claim 12, wherein the solid product has a savory or beef flavor.

14. The process according to claim 11, wherein the pH is adjusted to about 9.5.

15. The process according to claim 14, wherein the solid product has a chocolate, cocoa or yeasty flavor.

16. The process according to claim 11, wherein the pH is adjusted to about 10.5.

17. The process according to claim 16, wherein the solid product has an oily or bland flavor.

18. The process according to claim 1, wherein the solid product has flavoring properties.

19. A method for imparting flavoring properties to a food product comprising adding the solid product produced by the process of claim 18 to said food product.

20. A method for imparting flavoring properties to a food product suitable for human consumption comprising adding the solid product of the process of claim 18 to said food product.

21. The process according to claim 1, wherein the solids content in the solid product of said step (c) is about 90 to about 95% wt.

22. The process according to claim 1, wherein the step (b) comprises a two-step process wherein: (i) the pH-adjusted thin stillage portion is maintained at a temperature of between about 130° F. to about 210° F. for about 4 to about 14 hours; and (ii) the product of said step (i) is concentrated to obtain a substantially viscous product.

23. The process according to claim 22, wherein the product of said step (i) is concentrated in the step (ii) in an evaporator.

24. The process according to claim 23, wherein the evaporator utilizes a four stage process comprising the steps of:
 (i) concentrating the cooked pH-adjusted thin stillage portion at about 205° F. and a pressure of about 4 mm Hg;
 (ii) concentrating the product of said step (i) at about 190° F. and a pressure of about 11 mm Hg;
 (iii) concentrating the product of said step (ii) at about 170° F. and a pressure of about 18 mm Hg;
 (iv) concentrating the product of said step (iii) at about 121° F. and a pressure of about 26.5 mm Hg.

25. The process according to claim 1, wherein the step (b) comprises concentrating the cooked, pH-adjusted thin stillage portion in an evaporator.

26. The process according to claim 1, wherein the solid product has a total dietary fiber content of about 10 to about 28% by wt.

27. The process according to claim 1, wherein the solid product has a total dietary fiber content of about 13 to about 26% wt.

28. The process according to claim 1, wherein the solid product has a total dietary fiber content of about 15 to about 25% wt.

29. The process according to claim 1, wherein the cooked, concentrated pH-adjusted thin stillage portion has a solids content of between about 25% wt. to about 50% wt.

30. The process according to claim 1, wherein the cooked, concentrated pH-adjusted thin stillage portion has a solids content of between about 30% wt. to about 50% wt.

31. The process according to claim 1, wherein the concentrated pH-adjusted thin stillage portion has a solids content of between about 40% wt. to about 50% wt.

32. A composition of matter obtained by:
 (a) adjusting pH of a thin stillage portion produced during distillation to between about 7 to about 11;
 (b) cooking the pH-adjusted thin stillage portion at a temperature of between about 130° F. to about 210° F. for about 4 to about 14 hours and concentrating the cooked, pH-adjusted thin stillage portion to obtain a viscous product; and (c) drying the viscous product to obtain a substantially free-flowing solid product.

33. The composition of claim 32 which has flavoring properties.

34. The composition according to claim 32, wherein the pH is adjusted in the step (a) by adding to the thin stillage portion a base selected from the group consisting of hydroxides of alkali metals, hydroxides of alkaline earth metals, oxides of alkali metals, alkaline earth metals, and mixtures thereof.

35. The composition according to claim 32, wherein the pH is adjusted in said step (a) by adding to the thin stillage portion a base selected from the group consisting of calcium hydroxide, potassium hydroxide, sodium hydroxide, ammonium hydroxide and a mixture thereof.

36. The composition according to claim 35, wherein the base is sodium hydroxide.

37. The composition according to claim 36, wherein the pH is adjusted to about 8.5.

38. The composition according to claim 37 which has a bland, sweet or yeasty flavor.

39. The composition according to claim 36, wherein the pH is adjusted to about 9.5.

40. The composition according to claim 39 which has a maple or caramel flavor.

41. The composition according to claim 36, wherein the pH is adjusted to about 10.5.

42. The composition according to claim 41 which has a cracker or nutty flavor.

43. The composition according to claim 35, wherein the base is potassium hydroxide.

44. The composition according to claim 43, wherein the pH is adjusted to about 8.5.

45. The composition according to claim 44, which has a savory or beef flavor.

46. The composition according to claim 43, wherein the pH is adjusted to about 9.5.

47. The composition according to claim 46 which has a chocolate, cocoa or yeasty flavor.

48. The composition according to claim 43, wherein the pH is adjusted to about 10.5.

49. The composition according to claim 48 which has an oily or bland flavor.

50. The composition according to claim 32, wherein the concentrating portion of said step (b) is conducted in an evaporator.

51. The composition according to claim 50, wherein the evaporator utilizes a four stage process comprising the steps of:
(i) concentrating the pH-adjusted thin stillage portion at about 205° F. and a pressure of about 4 mm Hg;
(ii) concentrating the product of said step (i) at about 190° F. and a pressure of about 11 mm Hg;
(iii) concentrating the product of said step (ii) at about 170° F. and a pressure of about 18 mm Hg;
(iv) concentrating the product of said step (iii) at about 121° F. and a pressure of about 26.5 mm Hg.

52. The composition according to claim 32, comprising about 10 to about 28% by weight of total dietary fiber.

53. A composition consisting essentially of a thin stillage portion produced during distillation, which has a pH of between about 7 to about 11.

54. The composition of claim 53 whose temperature is maintained at about 130° F. to about 210° F. for about 4 to about 14 hours.

55. A method of treating a thin stillage portion only produced during distillation comprising adjusting pH of the thin stillage portion only to about 7 to about 11.

56. The method of claim 55 further comprising cooking the pH-adjusted thin stillage portion at a temperature of between about 130° to about 210° F. for about 4 to about 14 hours.

57. The process of producing alcohol and treating a thin stillage portion produced during alcohol distillation comprising:
(a) preparing a mixture of starch-containing grains and water and adding to said mixture a starch metabolizing microorganism;
(b) incubating the mixture of said step (a) under such conditions that substantially all of the starch in said starch-containing grains is converted to alcohol;
(c) separating the mixture of said step (b) into an alcohol portion and a spent mash portion by distillation;
(d) separating the spent mash portion obtained in step (c) into a thin stillage portion and a wet distillers' grains portion;
(e) adjusting the pH of the thin stillage portion obtained in step (d) to between about 7 to about 11;
(f) maintaining the pH-adjusted thin stillage portion at a temperature of between about 130° F. to about 210° F. for about 4 to about 14 hours and concentrating said cooked pH-adjusted thin stillage portion to substantially increase the viscosity thereof;
(g) drying the product of said step (f) to obtain a substantially free flowing solid product.

58. The process according to claim 57, wherein the pH is adjusted in the step (e) by adding to the thin stillage portion a base selected from the group consisting of sodium hydroxide, potassium hydroxide, calcium hydroxide, ammonium hydroxide and a mixture thereof.

59. The process according to claim 58, wherein the solid product has flavoring properties.

* * * * *